(12) United States Patent
Sato

(10) Patent No.: US 8,697,782 B2
(45) Date of Patent: Apr. 15, 2014

(54) RUBBER COMPOSITION

(75) Inventor: Takeshi Sato, Kanagawa (JP)

(73) Assignee: NOK Corporation, Tokyo (JP)

( * ) Notice: Subject to any disclaimer, the term of this patent is extended or adjusted under 35 U.S.C. 154(b) by 87 days.

(21) Appl. No.: 12/665,991

(22) PCT Filed: Jun. 11, 2008

(86) PCT No.: PCT/JP2008/060650
§ 371 (c)(1),
(2), (4) Date: Dec. 22, 2009

(87) PCT Pub. No.: WO2009/001674
PCT Pub. Date: Dec. 31, 2008

(65) Prior Publication Data
US 2010/0190895 A1    Jul. 29, 2010

(30) Foreign Application Priority Data

Jun. 26, 2007  (JP) .................................. 2007-167368

(51) Int. Cl.
*C08L 95/00*  (2006.01)

(52) U.S. Cl.
USPC ............................... 524/59; 524/71; 524/495

(58) Field of Classification Search
USPC ............................................ 524/59, 71, 495
See application file for complete search history.

(56) References Cited

U.S. PATENT DOCUMENTS

| | | | |
|---|---|---|---|
| 4,803,020 A * | 2/1989 | Valaitis et al. | 264/488 |
| 5,370,755 A | 12/1994 | Davis et al. | |
| 5,389,715 A | 2/1995 | Davis et al. | |
| 6,593,432 B1 * | 7/2003 | Ikemoto et al. | 525/331.8 |
| 2004/0181022 A1 | 9/2004 | Saito et al. | |
| 2006/0142492 A1 * | 6/2006 | Park | 525/199 |
| 2006/0178485 A1 | 8/2006 | Shimakage et al. | |

FOREIGN PATENT DOCUMENTS

| | | |
|---|---|---|
| JP | 03-221548 | 9/1991 |
| JP | 06-322186 | * 11/1994 |
| JP | 10-231471 | 9/1998 |
| JP | 2000-239450 | 9/2000 |
| JP | 2002-030233 | * 1/2002 |
| JP | 2002-053718 | 2/2002 |
| JP | 2003-212361 | 7/2003 |
| JP | 2003-246976 | 9/2003 |
| JP | 2004-346087 | 12/2004 |
| JP | 2005-255857 | 9/2005 |
| JP | 2006-037115 | 9/2006 |
| JP | 2007-153953 | 6/2007 |

OTHER PUBLICATIONS

Machine translation of JP 06-322186.*
Machine translation of JP 2002-030233.*
International Preliminary Report on Patentability (Chapter I) and Written Opinion from corresponding PCT Appl. No. PCT/JP2008/060650, dated Jan. 21, 2010, 6 pages.

* cited by examiner

*Primary Examiner* — Ling Choi
*Assistant Examiner* — Wenwen Cai
(74) *Attorney, Agent, or Firm* — Brinks Gilson & Lione

(57) ABSTRACT

Cross-linked rubber obtained from a rubber composition, which comprises 100 parts by weight of EPDM, 5-120 parts by weight carbon black, 70-150 parts by weight of fine bituminous powder, and 0.2-8 parts by weight of an organic peroxide, has distinguished heat resistance and sealability, and can suppress blister generation due to pressure changes when used in contact with carbon dioxide, and is specifically distinguished foaming-resistance characteristics due to abrupt pressure reduction of carbon dioxide, which are the necessary characteristics of seal material for carbon dioxide refrigerant, and also distinguished compression set characteristics, which determine the product life at elevated temperatures, and thus is suitable for use as carbon dioxide seal materials, such as O rings, packings, gaskets, oil seals, valves, etc.

3 Claims, No Drawings

RUBBER COMPOSITION

RELATED APPLICATIONS

The present application is a 35 U.S.C. §371 national stage filing of International Patent Application No. PCT/JP2008/060650, filed Jun. 11, 2008, to which priority is claimed under 35 U.S.C. §120 and through which priority is claimed under 35 U.S.C. §119 to Japanese Priority Patent Application No. 2007-167368, filed Jun. 26, 2007.

TECHNICAL FIELD

The present invention relates to a rubber composition, and more particularly to a rubber composition for use as effective materials for forming carbon dioxide seal materials.

BACKGROUND ART

Carbon dioxide is now regarded as a promising refrigerant as a substitute for ion gases in the industrial or domestic freezers or refrigerators, or domestic air conditioners, car air conditioners, etc., but involves such problems as permeation of carbon dioxide into seal materials (wing to a high solubility of carbon dioxide into polymer materials such as rubber, etc., or generation of blisters due to pressure changes in the use circumstances.

The present applicant have already proposed a butyl rubber composition, a resin/EPDM-based thermoplastic elastomer, etc. as carbon dioxide seal materials, but further improvements have been desired for the butyl rubber with respect to the heat resistance characteristics and for the thermoplastic elastomers with respect to the low-temperature characteristics.

Patent Document 1: JP-A-2002-53718
Patent Document 2: JP-A-10-231471

Compositions comprising hydrogenated NBR, EPDM or the like are also known as carbon dioxide seal materials. However, hydrogenated NBR has a distinguished carbon dioxide impermeability, but generally suffers from a high hardness and a large compression set, and thus the sealability as gasket materials is not satisfactory, as compared with other materials. EPDM has distinguished heat resistance and sealability, but still now fails to satisfy the carbon dioxide impermeability and foaming resistance.

Patent Document 3 JP-A-2003-246976
Patent Document 4 JP-A-2003-212361

DISCLOSURE OF THE INVENTION

Problem to be Solved by the Invention

The object of the present invention is to provide a rubber composition capable of giving a cross-linked rubber having distinguished heat resistance and sealability, and suppressed generation of blisters due to pressure changes when used in contact with carbon dioxide.

Means for Solving the Problem

The object of the present invention can be attained by a rubber composition, which comprises 100 parts by weight of EPDM, 5-120 parts by weight of carbon black, 70-150 parts by weight of fine bituminous powder, and 0.2-8 parts by weight of an organic peroxide.

Effect of the Invention

The cross-linked rubber made of the present rubber composition has distinguished foaming resistance characteristics against abrupt reduction in carbon dioxide pressure, which are necessary characteristics of seal materials for carbon dioxide refrigerant, and also distinguished compression set characteristics, which determine the product life when exposed to elevated temperatures, and thus is suitable for use as seal materials for the carbon dioxide refrigerant, for example, O rings, packings, gaskets, oil seals, valves, etc.

BEST MODES FOR CARRYING OUT THE INVENTION

Ethylene-propylene-diene terpolymer rubber (EPDM), comprising terpolymers of ethylene and propylene with a small portion of various diene components, can be used in the present invention. Practically, commercially available various EPDMs can be used as such.

Furnace black generally used as a reinforcing agent can be used as carbon black in the present invention, but from the viewpoint of kneadability and moldability when used with highly filled fine bituminous powder, carbon black with a nitrogen gas adsorption specific surface area $N_2SA$ of 20-60 $m^2/g$ and a DBP oil absorption amount of 40-130 ml/100 g, for example, FEF carbon black, SRF carbon black, etc. can be preferably used. The carbon black can be used in a proportion of about 5 to about 120 parts by weight, preferably about 20 to about 80 parts by weight, on the basis of 100 parts by weight of EDPM. When the carbon black is used in a proportion of less than the defined amount, the $CO_2$ formability will be smaller, but the expansion following dipping in liquefied $CO_2$ will be larger, deteriorating the $CO_2$ resistance, whereas in a proportion of more than the defined amount, on the other hand, the compression set will be deteriorated and thus this is not preferable from the viewpoint of product life.

The fine bituminous powder for use in the present invention includes fine powder obtained by pulverizing bituminous materials such as coal, etc. to an average particle size (determined by Microtrac SRA150 Particle size Analyzer, a product of Leeds-Northrup Co.) of about 10 µm or less, generally about 1 to about 10 µm, preferably about 3 to about 8 µm, for example, Austin black having a specific gravity of 1.2-1.5. When the average particle size is more than the defined size, the strength at break and the elongation at break of rubber will be lowered, and the practical use will be lost on the strength side. Practically, commercially available products such as Mineral Black 325 BA, a product of Keystone Filley & Mfg. Co., Austin Black 325, a product of Coal Fillers Co., etc. can be used as such. The fine bituminous powder can be used in a proportion of about 70 to about 150 parts by weight, preferably about 80 to about 130 parts by weight, on the basis of 100 parts by weight of EPDM. When the fine bituminous powder is used in a proportion of less than the defined amount, the desired foaming resistance cannot be obtained, whereas in a proportion of more than the defined amount, the viscosity of the composition will be much increased due to reduced rubber component, causing a kneading or molding trouble, or also a problem of carbon dioxide expansion.

It is known that the cross-linked rubber obtained by peroxide cross-linking a composition comprising a peroxide-cross-linkable, fluorine-containing elastomer, a fine bituminous powder, and other essential compounding ingredients has distinguished cold resistance and compression set characteristics, where the disclosed proportion of the fine bituminous powder is 5-30 parts by weight on the basis of 100 parts by weight of the fluorine-containing elastomer, and no mention is made at all on $CO_2$ foamability and $CO_2$ resistance.

Patent Document 5 JP-A-2004-346087

Any organic peroxide can be used without any special limitation, so long as it can be generally used in the cross-linking of EPDM, and includes, for example, t-butyl peroxide, dicumyl peroxide, t-butyl cumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3,1,3-di(t-butylperoxyisopropyl)benzene, 2,5-dimethyl-2,5-di(benzolyperoxy)hexane, t-butylperoxybenzoate, t-butylperoxyisopropyl carbonate, 2-butyl-4,4-di(t-butylperoxy)valerate, etc. The organic peroxide can be used in a proportion of 0.2-8 parts by weight, preferably 2-5 parts by weight, on the basis of 100 parts by weight of EPDM. When the organic peroxide is used in a proportion of more than the defined amount, no satisfactory vulcanization products will be obtained due to foaming or, if obtained, the rubber elasticity and elongation will be lowered.

The rubber composition comprising the afore-mentioned essential components can further appropriately contain, if required, compounding ingredients generally used in the rubber industry, for example, a reinforcing agent such as carbon black, etc.; a processing aid such as stearic acid, palmitic acid, paraffin wax, etc.; an acid acceptor such as a divalent metal oxide or hydroxide such as zinc oxide, magnesium oxide, etc. or hydrotalcite-related compounds, an antioxidant, a plasticizer, etc.

The rubber composition can be prepared by kneading the afore-mentioned components by a kneading machine such as Intermix, a kneader, a Banbury mixter, etc., or through open rolls, etc., and vulcanization can be carried out generally by heating at 150°-200° C. for about 3 to about 60 minutes by an injection molding machine, a compression molding machine, a vulcanization press, etc., and if necessary, secondary vulcanization can be carried out by heating at 150°-250° C. for about 0.5 to about 24 hours.

EXAMPLES

The present invention will be described in detail below, referring to Examples.

Example 1

| | Parts by weight |
|---|---|
| EPDM (EP33, a product of JSR) | 100 |
| FEF carbon black | 40 |
| Fine bituminous powder (Austin black 325; average particle size: 6 μm, and specific gravity: 1.32) | 100 |
| Zinc oxide | 5 |
| Antioxidant (Irganox 1010, a product of Ciba Specialty Chemicals, Inc.) | 1 |
| Dicumyl peroxide | 3 |

The foregoing components were kneaded together through a kneader and open rolls, and the resulting kneaded mixture was subjected to press vulcanization at 170° for 20 minutes, and then to oven vulcanization (secondary vulcanization) at 150° C. for 30 minutes to obtain a cross-linked sheet, 150 mm×150 mm×2 mm, and a G25 size (inner diameter 24.4 mm and wire diameter=3.1 mm) O ring.

Example 2

In Example 1, the amount of FEF carbon black was changed to 10 parts by weight, and that of fine bituminous power to 140 parts by weight.

Comparative Example 1

In Example 1, the amount of FEF carbon black was changed to 100 parts by weight, and that of fine bituminous powder to 50 parts by weight.

Comparative Example 2

In Example 1, no FEF carbon black was used, and the amount of fine bituminous powder was changed to 170 parts by weight.

Comparative Example 3

In Example 1, no fine bituminous powder was used, and the amount of FEF carbon black was changed to 110 parts by weight.

Comparative Example 4

In Example 1, no fine bituminous powder was used, and 130 parts by weight of SRF carbon black was used in place of FEF carbon black.

Comparative Example 5

In Example 1, no fine bituminous powder was used, and 100 parts by weight of white carbon (Nipsil ER, a product of Toso-Silica Co.) was used in place of FEF carbon black.

The cross-linked sheets and G25 O-rings obtained in the foregoing Examples and Comparative Examples were subjected to determination of normal state physical properties and compression set, and also to $CO_2$ foaming test (blister test) and $CO_2$ dipping-expansion test.

Normal state physical properties: according to JIS K6253 and JIS K6251, corresponding to ASTM D412

Compression set: according to JIS K6262, corresponding to ASTM D395

$CO_2$ foaming test: An O ring and liquefied carbon dioxide were charged into a pressure vessel, and left standing at 25° C. for 24 hours, followed by releasing the pressure and heating in a thermostat tank at 150° C. for one hour, and then the heated sample was cut to 50 sample pieces to count number of sample pieces with foamed cut faces $CO_2$ dipping-expansion test: An O ring was dipped into liquefied carbon dioxide in a pressure vessel at 25° C. for 24 hours, immediately followed by measuring the weight of O ring to determine percent change in the weight of O ring before and after the dipping The results are shown in the following Table.

TABLE

| | Example No. | | Comp. Ex. No. | | | | |
|---|---|---|---|---|---|---|---|
| Test item | 1 | 2 | 1 | 2 | 3 | 4 | 5 |
| [Normal state physical properties] | | | | | | | |
| Hardness (Durometer A) | 86 | 84 | 86 | 85 | 86 | 85 | 84 |
| Tensile strength (MPa) | 8.00 | 7.12 | 14.3 | 4.4 | 16.9 | 17.6 | 18.6 |
| Elongation (%) | 150 | 230 | 160 | 230 | 190 | 160 | 170 |

TABLE-continued

| | Example No. | | Comp. Ex. No. | | | | |
|---|---|---|---|---|---|---|---|
| Test item | 1 | 2 | 1 | 2 | 3 | 4 | 5 |
| [Compression set] | | | | | | | |
| 150° C. for 70 hrs (%) | 30 | 24 | 35 | 18 | 48 | 41 | 20 |
| [$CO_2$ foaming test] | | | | | | | |
| $CO_2$ foamability | 0/50 | 0/50 | 41/50 | 0/50 | 22/50 | 3/50 | 50/50 |
| [$CO_2$ dipping-expansion test] | | | | | | | |
| Percent change in weight (%) | 15 | 52 | 10 | 450 | 10 | 15 | 13 |

INDUSTRIAL UTILITY

Seal materials obtained by cross-linking molding of the present EPDM rubber composition can be effectively used for industrial and domestic air conditioners, freezers, refrigerators, domestic and industrial hot-water suppliers using heat pump, etc.

The invention claimed is:

1. A rubber composition, which comprises 100 parts by weight of EPDM, 5-120 parts by weight of carbon black selected from FEF carbon black and SRF carbon black and having a nitrogen adsorption specific surface area $N_2SA$ of 20-60 m$^2$/g and a DBP oil absorption amount of 40-130 l/100 g, 70-150 parts by weight of fine bituminous powder having an average particle size of 10 μm or less and a specific gravity of 1.2-1.5, and 0.2-8 parts by weight of an organic peroxide.

2. A carbon dioxide refrigerant seal material obtained by molding a rubber composition according to claim 1.

3. A carbon dioxide refrigerant seal material obtained by cross-linking molding of a rubber composition of claim 1.

* * * * *